US009614206B2

(12) United States Patent
Choi et al.

(10) Patent No.: US 9,614,206 B2
(45) Date of Patent: Apr. 4, 2017

(54) MIDDLE OR LARGE-SIZED BATTERY PACK CASE PROVIDING IMPROVED DISTRIBUTION UNIFORMITY IN COOLANT FLUX

(75) Inventors: Dooseong Choi, Daejeon (KR); Ye Hoon Im, Daejeon (KR); Sang Phil Han, Daejeon (KR); Jaesung Ahn, Daejeon (KR); Dal Mo Kang, Daejeon (KR); Jongmoon Yoon, Daejeon (KR); Heekook Yang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 783 days.

(21) Appl. No.: 12/532,068

(22) PCT Filed: Dec. 21, 2007

(86) PCT No.: PCT/KR2007/006712
§ 371 (c)(1),
(2), (4) Date: Mar. 26, 2010

(87) PCT Pub. No.: WO2008/114923
PCT Pub. Date: Sep. 25, 2008

(65) Prior Publication Data
US 2010/0203376 A1    Aug. 12, 2010

(30) Foreign Application Priority Data

Mar. 21, 2007  (KR) .......................... 10-2007-0027401

(51) Int. Cl.
*H01M 10/6563* (2014.01)
*H01M 10/052* (2010.01)
(Continued)

(52) U.S. Cl.
CPC ......... *H01M 2/1077* (2013.01); *H01M 2/348* (2013.01); *H01M 10/052* (2013.01);
(Continued)

(58) Field of Classification Search
CPC ......... H01M 10/5004; H01M 10/5016; H01M 10/5032; H01M 2/1205; H01M 10/5059;
(Continued)

(56) References Cited

U.S. PATENT DOCUMENTS 6,613,472 B1    9/2003  Watanabe
6,689,510 B1 *  2/2004  Gow et al. .................... 429/149
(Continued)

FOREIGN PATENT DOCUMENTS

FR           482214 A      3/1917
JP        2000-67934 A    3/2000
(Continued)

*Primary Examiner* — Barbara Gilliam
*Assistant Examiner* — Angela Martin
(74) *Attorney, Agent, or Firm* — Birch, Stewart, Kolasch & Birch, LLP

(57) ABSTRACT

Disclosed herein is a middle- or large-sized battery pack case in which a battery module having a plurality of stacked battery cells, which can be charged and discharged, is mounted, wherein the battery pack case is provided with a coolant inlet port and a coolant outlet port, which are disposed such that a coolant for cooling the battery cells can flow from one side to the other side of the battery module in the direction perpendicular to the stacking direction of the battery cells, and the battery pack case is further provided with a flow space ('inlet duct') extending from the coolant inlet port to the battery module and another flow space (Outlet duct') extending from the battery module to the coolant outlet port, the inlet duct having a vertical sectional area less than that of the outlet duct.

13 Claims, 4 Drawing Sheets

(51) Int. Cl.
*H01M 10/6566* (2014.01)
*H01M 10/651* (2014.01)
*H01M 10/613* (2014.01)
*H01M 2/10* (2006.01)
*H01M 2/34* (2006.01)
*H01M 10/617* (2014.01)
*H01M 10/30* (2006.01)

(52) U.S. Cl.
CPC ....... *H01M 10/613* (2015.04); *H01M 10/617* (2015.04); *H01M 10/651* (2015.04); *H01M 10/6563* (2015.04); *H01M 10/6566* (2015.04); *H01M 10/30* (2013.01); *Y02E 60/122* (2013.01); *Y02T 10/7011* (2013.01)

(58) Field of Classification Search
CPC .......... H01M 10/5057; H01M 2/1252; H01M 10/6563
USPC ............................................. 429/120, 83, 99
See application file for complete search history.

(56) References Cited

U.S. PATENT DOCUMENTS 7,230,404 B2   6/2007  Kimoto et al.

2006/0091856 A1*  5/2006  Lee et al. ...................... 320/116
2006/0093901 A1*  5/2006  Lee et al. ...................... 429/120
2008/0187820 A1   8/2008  Nakano et al.
2009/0258282 A1* 10/2009  Harada ............... H01M 10/625
                                                                    429/61

FOREIGN PATENT DOCUMENTS

| | | | | |
|---|---|---|---|---|
| JP | 2000-133225 | * | 5/2000 | ............. H01M 2/10 |
| JP | 2000-243461 A | | 9/2000 | |
| JP | 2001-167803 A | | 6/2001 | |
| JP | 2003-346923 A | | 12/2003 | |
| JP | 2004-6089 A | | 1/2004 | |
| JP | 2004-288527 A | | 10/2004 | |
| JP | 2004-319232 | * | 11/2004 | ........... H01M 10/50 |
| JP | 2004-319232 A | | 11/2004 | |
| JP | 2005-302590 | * | 10/2005 | ............. H01M 2/10 |
| JP | 2005-302590 A | | 10/2005 | |
| JP | 2005/310461 A | | 11/2005 | |
| KR | 10-2006-0037625 A | | 5/2006 | |
| WO | WO 2006/073071 A1 | | 7/2006 | |
| WO | WO 2006/093010 A1 | | 9/2006 | |
| WO | WO 2008/082111 A1 | | 7/2008 | |

* cited by examiner

<Flux distribution in channel between cells>

MIDDLE OR LARGE-SIZED BATTERY PACK CASE PROVIDING IMPROVED DISTRIBUTION UNIFORMITY IN COOLANT FLUX

FIELD OF THE INVENTION

The present invention relates to a middle- or large-sized battery pack case providing improved distribution uniformity in coolant flux, and, more particularly, to a middle- or large-sized battery pack case in which a battery module having a plurality of stacked battery cells, which can be charged and discharged, is mounted, wherein the battery pack case is provided with a coolant inlet port and a coolant outlet port, which are disposed such that a coolant can flow from one side to the other side of the battery module in the direction perpendicular to the stacking direction of the battery cells, and the battery pack case is further provided with an inlet duct and an outlet duct, the inlet duct having a vertical sectional area less than that of the outlet duct.

BACKGROUND OF THE INVENTION

Recently, a secondary battery, which can be charged and discharged, has been widely used as an energy source for wireless mobile devices. Also, the secondary battery has attracted considerable attention as a power source for electric vehicles (EV) and hybrid electric vehicles (HEV), which have been developed to solve problems, such as air pollution, caused by existing gasoline and diesel vehicles using fossil fuel.

Small-sized mobile devices use one or several battery cells for each device. On the other hand, middle- or large-sized devices, such as vehicles, use a middle- or large-sized battery module having a plurality of battery cells electrically connected with each other because high power and large capacity are necessary for the middle- or large-sized devices.

Preferably, the middle- or large-sized battery module is manufactured with small size and weight if possible. For this reason, a prismatic battery or a pouch-shaped battery, which can be stacked with high integration and has a small weight to capacity ratio, is usually used as a battery cell of the middle- or large-sized battery module. Especially, much interest is currently generated in the pouch-shaped battery, which uses an aluminum laminate sheet as a sheathing member, because the weight of the pouch-shaped battery is small, the manufacturing costs of the pouch-shaped battery are low, and it is easy to modify the shape of the pouch-shaped battery.

For the middle- or large-sized battery module to provide power and capacity required by a predetermined apparatus or device, it is necessary for the middle- or large-sized battery module to be constructed in a structure in which a plurality of battery cells are electrically connected in series with each other, and the battery cells are stable against an external force.

Also, the battery cells constituting the middle- or large-sized battery module are secondary batteries which can be charged and discharged. Consequently, a large amount of heat is generated from the high-power, large-capacity secondary battery during the charge and discharge of the battery cells. If the heat, generated from the unit cells during the charge and discharge of the unit cells, is not effectively removed, the heat accumulates in the respective unit cells, and therefore, the deterioration of the unit cells is accelerated. According to circumstances, the unit cells may catch fire or explode. For this reason, a cooling system is needed in a battery pack for vehicles, which is a high-power, large-capacity battery.

In a middle- or large-sized battery pack including a plurality of battery cells, on the other hand, the deterioration of the performance of some battery cells leads to the deterioration of the performance of the battery pack. One of the main factors causing the nonuniformity of the performance is the nonuniformity of cooling between the battery cells. For this reason, it is required to provide a structure to secure the uniformity of cooling during the flow of a coolant.

Especially, in the middle- or large-sized battery pack, the vertical sectional area of a duct at a coolant inlet port side (hereinafter, referred as an 'inlet port') and a duct at a coolant outlet port side (hereinafter, referred as an 'outlet port') has a great influence on the coolant flux distribution in the battery pack.

Generally, if the vertical sectional area of the inlet port is greater than or equal to that of the outlet port, a relatively large amount of coolant is introduced into a channel between the battery cells near the coolant inlet port, whereas a relatively small amount of coolant is introduced into a channel between the battery cells far away from the coolant inlet port, with the result that it is difficult to accomplish the uniform cooling between the battery cells.

As a technology for solving the problem caused due to the nonuniform distribution of the coolant, a technology for improving the cooling efficiency by the provision of a structure in which a communication member is provided at a coolant inlet port and a coolant outlet port of a battery module, and the communication member includes a first connection channel (inlet duct) and a second connection channel (outlet duct) is disclosed in Korean Patent Application Publication No. 2006-037625. According to the disclosed technology, the sectional area of the channel between the battery cells increases as the channel becomes more distant from the coolant inlet port, thereby partially accomplishing cooling uniformity. However, the vertical sectional areas of the first and second connection channels are the same, and therefore, a large amount of coolant is driven into the channel between the battery cells near the coolant inlet port. As a result, it is not possible to thoroughly accomplish the uniformity of cooling between the battery cells.

Consequently, there is a high necessity for a technology to fundamentally solve the above-mentioned problems.

SUMMARY OF THE INVENTION

Therefore, the present invention has been made to solve the above problems, and other technical problems that have yet to be resolved.

As a result of a variety of extensive and intensive studies and experiments on a middle- or large-sized battery pack case, the inventors of the present invention have found that, when the battery pack case is constructed in a structure in which the vertical sectional area of an inlet duct formed at the battery pack case is less than that of an outlet duct formed at the battery pack case, it is possible to uniformly distribute the flux of a coolant flowing through a channel defined between battery cells, with the result that heat accumulated between battery cells is effectively removed, and therefore, the performance and life span of the battery cells are greatly improved. The present invention has been completed based on these findings.

In accordance with one aspect of the present invention, the above and other objects can be accomplished by the provision of a middle- or large-sized battery pack case in which a battery module having a plurality of stacked battery cells, which can be charged and discharged, is mounted, wherein the battery pack case is provided with a coolant inlet port and a coolant outlet port, which are disposed such that a coolant for cooling the battery cells can flow from one side to the other side of the battery module in the direction perpendicular to the stacking direction of the battery cells, and the battery pack case is further provided with a flow space ('inlet duct') extending from the coolant inlet port to the battery module and another flow space ('outlet duct') extending from the battery module to the coolant outlet port, the inlet duct having a vertical sectional area less than that of the outlet duct.

In the middle- or large-sized battery pack case according to the present invention, as described above, the vertical sectional area of the inlet duct is less than that of the outlet duct. Consequently, when comparing the inventive structure in which the vertical sectional area of the inlet duct is less than that of the outlet duct with the conventional structure in which the vertical sectional area of the inlet duct is greater than or equal to that of the outlet duct, it is possible to uniformalize the flux of the coolant flowing through the channel between the battery cells, and effectively removing heat generated during the charge and discharge of the battery cells through the uniform flow of the coolant, thereby improving the cooling efficiency and the performance of the battery.

The battery module, mounted in the middle- or large-sized battery pack case according to the present invention, is generally manufactured by a method of stacking a plurality of battery cells with high integration. At this time, the neighboring battery cells are spaced apart from each other at regular intervals such that heat generated during the charge and discharge of the battery cells can be removed. For example, the battery cells may be sequentially stacked such that the battery cells are spaced apart from each other at predetermined intervals without using additional members. When the battery cells have a low mechanical strength, one or several battery cells are mounted in a cartridge, and a plurality of cartridges are stacked to constitute a battery module. Consequently, a coolant channel is defined between the respective battery cells such that heat accumulated between the stacked battery cells is effectively removed.

The inlet duct and the outlet duct are flow spaces through which a coolant for effectively removing heat from the battery cells during the charge and discharge of the battery cells is introduced and discharged, respectively. The inlet duct and the outlet duct are formed at the upper part and the lower part of the battery pack case.

In a preferred embodiment, the inlet duct has a vertical sectional area equivalent to 50 to 90% of the vertical sectional area of the outlet duct. If the vertical sectional area of the coolant inlet duct is too small, the energy consumption for the flow of the coolant is greatly increased. If the vertical sectional area of the coolant inlet duct is too large, on the other hand, it is difficult to achieve the uniform distribution of the coolant flux between the battery cells, as previously described.

In the specification, the difference of the vertical sectional area between the inlet duct and the outlet duct may result from (a) the difference of the height between the ducts in a condition of the ducts having the same width, (b) the difference of the width between the ducts in a condition of the ducts having the same height, or (c) the difference of the width and height between the ducts. Preferably, the difference of the vertical sectional area between the inlet duct and the outlet duct results from the structure (a), i.e., the difference of the vertical height between the ducts in a condition of the ducts having the same width.

The experiments carried out by the inventors of the present invention revealed that, when the inlet duct had a vertical height equivalent to 55 to 85% of the vertical height of the outlet duct, the present invention provided optimum effects.

The battery pack case according to the present invention is preferably applied to a structure in which the cooling efficiency is critical. Specifically, the battery pack case is preferably constructed in a structure in which the length of the battery pack case in the stacking direction of the battery cells is greater than the length of the battery pack case in the lateral direction of the battery cells, and the ducts are arranged parallel to the stacking direction of the battery cells.

The ducts include the inlet duct and the outlet duct. For example, the inlet duct may be formed at the upper part of the battery pack case such that the inlet duct is parallel to the stacking direction of the battery cells, and the outlet duct may be formed at the lower part of the battery pack case such that the inlet duct is parallel to the stacking direction of the battery cells. In this case, the coolant is introduced through the coolant inlet port, flows along the inlet duct, is uniformly distributed to the channel between the battery cells, flows along the outlet duct, and is discharged outside through the coolant outlet port. Of course, the inlet duct may be formed at the lower part of the battery pack case such that the inlet duct is parallel to the stacking direction of the battery cells, and the outlet duct may be formed at the upper part of the battery pack case such that the inlet duct is parallel to the stacking direction of the battery cells.

Preferably, the battery pack case is constructed in a structure in which a suction fan is mounted in the coolant outlet port for rapidly and smoothly moving the coolant, introduced through the coolant inlet port, to the coolant outlet port, such that the coolant is discharged out of the battery pack, after the coolant flows through the battery module. In this structure, that the coolant, introduced through the narrow coolant inlet port, sufficiently reaches the battery cells far away from the coolant inlet port, at a high flow speed of the coolant, by a coolant driving force generated from the suction fan, and therefore, the relatively uniform distribution of the coolant flux is achieved in the condition of the same coolant flux.

According to circumstances, the battery pack case may be further provided with beads formed in a concavo-convex shape for improving the structural stability of the battery pack case against an external force. In this case, the beads are constructed in a structure in which the beads do not disturb the flow of the coolant from the coolant inlet port along the advancing direction of a fluid in the flow space ("inlet duct") extending from the coolant inlet port to the battery module.

Specifically, the beads effectively complement the mechanical strength of the battery pack case such that the beads exhibit excellent durability or structural stability against an external force, such as twist or vibration. Furthermore, the beads do not disturb the flow of the coolant introduced into the battery pack case through the coolant inlet port, whereby heat generated from the battery cells, during the charge and discharge of the battery cells, is more effectively removed by the coolant.

In a preferred embodiment, the beads are constructed in a concavo-convex structure having a large length to width ratio, and the beads are arranged parallel to each other.

In a preferred embodiment in connection with the bead structure that does not disturb the flow of the coolant, the battery pack case is constructed in a structure in which the length of the battery pack case in the stacking direction of the battery cells is greater than the length of the battery pack case in the lateral direction of the battery cells, the beads are formed at the battery pack case such that the beads are arranged parallel to the lateral direction of the battery cells, and the beads are not formed at a predetermined region of the inlet duct adjacent to the coolant inlet port.

The influence of the beads on the flow of the coolant is the greatest at the region of the inlet duct adjacent to the coolant inlet port. Consequently, when the beads are formed from a region of the inlet duct spaced a predetermined distance from the coolant inlet port, the influence of the beads on the flow of the coolant is minimized.

For example, the region where the beads are not formed as described above may have a length equivalent to 10 to 30% of the total length of the inlet duct. If the length of the region where the beads are not formed is too small, the influence of the beads on the flow of the coolant is increased, and therefore, it is difficult to achieve a desired effect. If the length of the region where the beads are not formed is too large, on the other hand, the durability and the structural stability of the region where the beads are not formed are reduced. More preferably, the region where the beads are not formed has a length equivalent to 15 to 25% of the total length of the inlet duct.

In another preferred embodiment, the battery pack case is constructed in a structure in which the length of the battery pack case in the stacking direction of the battery cells is greater than the length of the battery pack case in the lateral direction of the battery cells, the beads are formed at the battery pack case such that the beads are arranged parallel to the lateral direction of the battery cells, and the inward height of the beads at a predetermined region of the inlet duct adjacent to the coolant inlet port is gradually decreased toward the coolant inlet port.

This structure includes a structure in which the inward height of the bead at the coolant inlet port side is relatively decreased, and the inward height of the beads is gradually increased as the beads become more distant from the coolant inlet port, or the inward height of the beads is gradually increased to a predetermined value, and then the original inward height of the beads is maintained from a next specific bead, in order to minimize the decrease of the structural stability of the battery pack case and, at the same time, further increase the distribution uniformity of coolant flux between the battery cells. In this case, the number of the beads the inward height of which is changed may be appropriately decided depending upon the degree of decrease of the structural strength of the battery pack case due to the height adjustment of the beads.

For example, the region where the inward height of the beads is gradually decreased preferably has a length equivalent to 15 to 50% of the total length of the inlet duct. If the length of the region where the inward height of the beads is gradually decreased is too small, the height of the beads is increased with a relatively large width in a narrow space, and therefore, it is difficult to achieve a desired effect. If the length of the region where the inward height of the beads is gradually decreased is too large, on the other hand, the durability and the structural stability of the region where the inward height of the beads is gradually decreased are decreased over a wide range. More preferably, the region where the inward height of the beads is gradually decreased has a length equivalent to 20 to 40% of the total length of the inlet duct.

In accordance with another aspect of the present invention, there is provided a middle- or large-sized battery pack constructed in a structure in which a battery module is mounted in the middle- or large-sized battery pack case with the above-stated construction.

The term "battery module" used in the specification inclusively means the structure of a battery system constructed in a structure in which two or more chargeable and dischargeable battery cells are mechanically and, at the same time, electrically connected with each other to provide high-power, large-capacity electricity. Therefore, the battery module itself may constitute a single apparatus or a part of the large-sized apparatus. For example, a plurality of small-sized battery modules are connected with each other to constitute a large-sized battery module.

The battery module may include a plurality of plate-shaped battery cells that can be charged and discharged. In the specification, the term 'plate shape' means the shape of a rectangular parallelepiped having a relatively large length to width ratio.

The battery cells may be secondary batteries, such as nickel metal hydride secondary batteries or lithium secondary batteries. Among them, the lithium secondary batteries are preferably used because the lithium secondary batteries have high energy density and discharge voltage. Based on its shape, a prismatic battery or a pouch-shaped battery is preferably used as a chargeable and dischargeable unit body constituting the battery module. More preferably, the pouch-shaped battery is used as the unit body of the battery module.

The middle- or large-sized battery pack according to the present invention is preferably used as a power source for electric vehicles or hybrid electric vehicles, the safety of which may seriously deteriorate due to high-temperature heat generated from a plurality of battery cells combined to provide high power and large capacity, during the charge and discharge of the battery cells.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
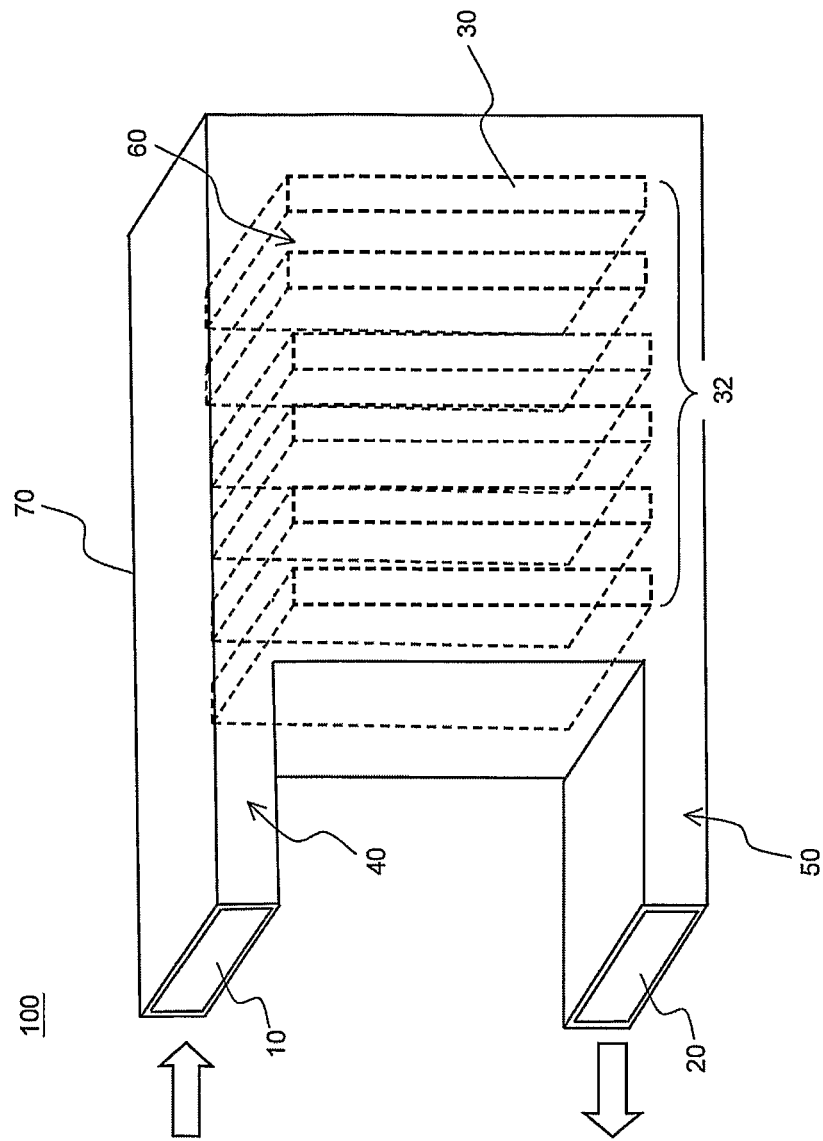
FIG. 1 is a perspective view illustrating a middle- or large-sized battery pack constructed in a structure in which a battery module is mounted in a conventional middle- or large-sized battery pack case.
Figure 2:
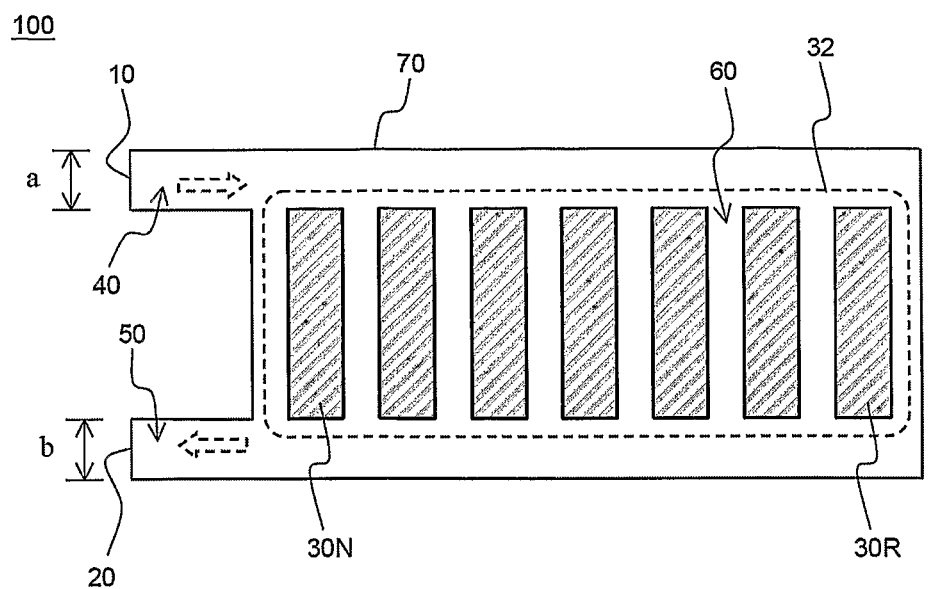
FIG. 2 is a sectional view typically illustrating the middle- or large-sized battery pack including the battery module mounted in the middle- or large-sized battery pack case shown in FIG. 1.

FIG. 1 is a perspective view illustrating a middle- or large-sized battery pack constructed in a structure in which a battery module is mounted in a conventional middle- or large-sized battery pack case, and FIG. 2 is a sectional view typically illustrating the middle- or large-sized battery pack including the battery module mounted in the middle- or large-sized battery pack case shown in FIG. 1.

Referring to these drawings, the middle- or large-sized battery pack 100 includes a battery module 32 constructed in a structure in which a plurality of plate-shaped battery cells 30 are electrically and mechanically connected with each other, a battery pack case 70 in which the battery module 32 is mounted, an inlet duct 40, as a flow space, extending from a coolant inlet port 10 to the battery module 32, and an outlet duct 50, as another flow space, extending from the battery module 32 to a coolant outlet port 20.

A coolant, introduced through the coolant inlet port 10, flows through a channel 60 defined between the inlet duct 40 and the battery cells 30. At this time, the coolant cools the battery cells 30. After that, the coolant flows through the outlet duct 50 and is then discharged out of the battery pack through the coolant outlet port 20.

The inlet duct 40 has a vertical height a equal to the vertical height b of the outlet duct 50. Consequently, the coolant flux is more distributed to the battery cell 30N nearest to the coolant inlet port 10, whereas the coolant flux is less distributed to the battery cell 30R farthest from the coolant inlet port 10.

Figure 3:
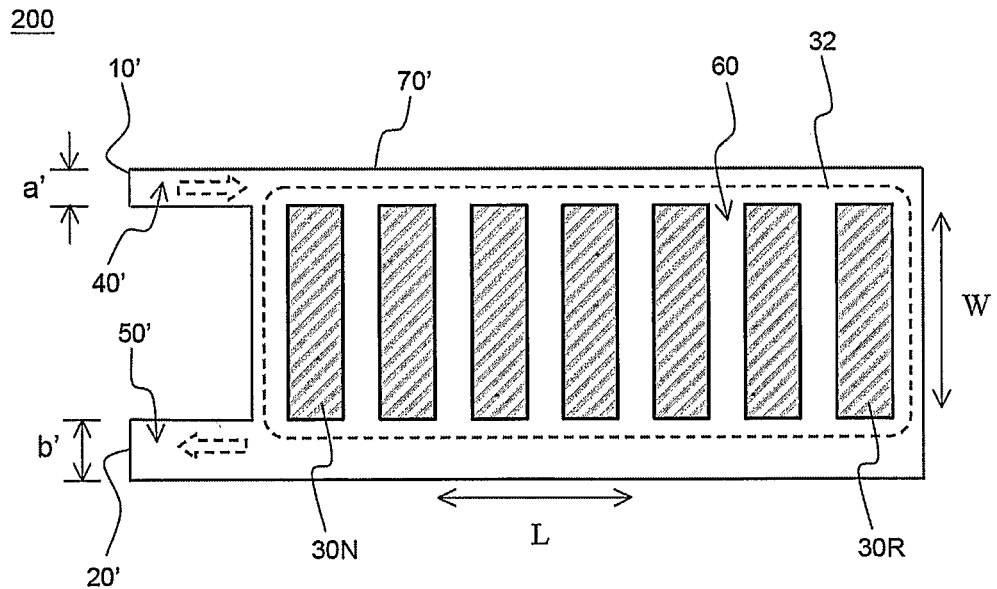
FIG. 3 is a sectional view typically illustrating a middle- or large-sized battery pack constructed in a structure in which a battery module is mounted in a battery pack case according to a preferred embodiment of the present invention.

FIG. 3 is a sectional view typically illustrating a middle- or large-sized battery pack constructed in a structure in which a battery module is mounted in a battery pack case according to a preferred embodiment of the present invention Referring to FIG. 3, the battery pack case 70' is constructed in a structure in which the length of the battery pack case 70' in the stacking direction L of the battery cells 30 is greater than the length of the battery pack case 70' in the lateral direction W of the battery cells 30. Also, the battery pack case 70' has a coolant inlet port 10' and a coolant outlet port 20', which are disposed such that a coolant can flow from one side to the other side of the battery module 32 in the direction perpendicular to the stacking direction L of the battery cells 30.

A small channel 60 is defined between the respective battery cells 30 of the battery module 32 such that the coolant can flow through the channel 60. Consequently, the coolant, introduced through the coolant inlet port 10', flows through the channel 60. At this time, heat generated from the battery cells 30 is removed by the coolant. After that, the coolant is discharged through the coolant outlet port 20'.

The battery pack case 70' according to this embodiment is different from the battery pack case 70 illustrated in FIGS. 1 and 2 in that an inlet duct 40', connected to the coolant inlet port 10', has a vertical height a' equivalent to 50 to 90% of the vertical height b' of an outlet duct 50', connected to the coolant outlet port 20'. Since the vertical height a' of the inlet duct 40' is less than the vertical height b' of the outlet duct 50', the coolant flux is uniformly distributed to the battery cells 30N and 30R.

Figure 4:
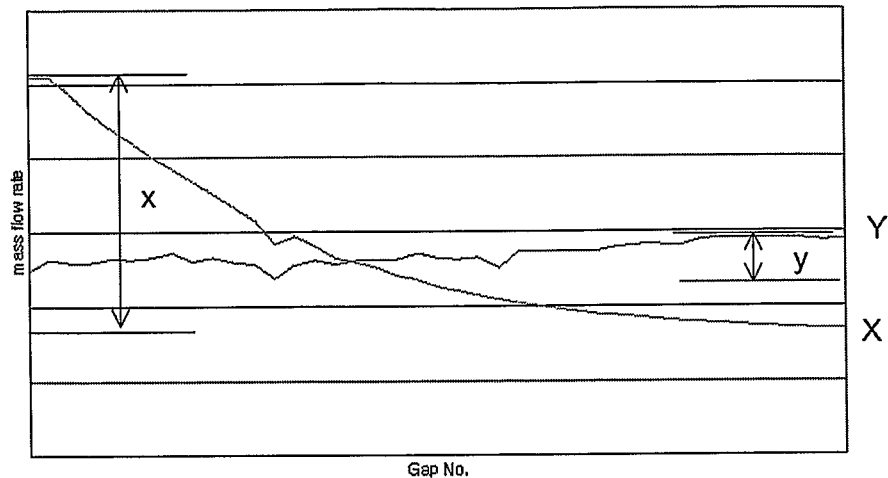
FIG. 4 is a graph illustrating the comparison between the measurement results of coolant flux distribution between battery cells of the middle- or large-sized battery packs manufactured in the structures shown in FIGS. 2 and 3.

In this connection, FIG. 4 is a graph illustrating the comparison between the measurement results of coolant flux distribution between battery cells of the middle- or large-sized battery packs manufactured in the structures shown in FIGS. 2 and 3. Specifically, both the measurement results X of coolant flux distribution in the middle- or large-sized battery pack 100 of FIG. 2 and the measurement results Y of coolant flux distribution in the middle- or large-sized battery pack 200 of FIG. 3, constructed in a structure in which the vertical height of the inlet duct is less than the vertical height of the outlet duct, are illustrated in FIG. 4.

When comparing the coolant flux difference y of the Y with the coolant flux difference x of the X, the coolant flux difference y of the Y is less than the coolant flux difference x of the X, during the flow of the coolant over the battery cells 30N adjacent to the coolant inlet port, and therefore, the distribution uniformity of coolant flux is improved.

This is because the vertical sectional area of the inlet duct 40' is less than that of the outlet duct 50', and therefore, the flow speed of the coolant in the inlet duct 40' is greater than that of the coolant in the outlet duct 50', with the result that the coolant is uniformly distributed to the battery cell 30R farthest from the coolant inlet port 10'.

Figure 5:
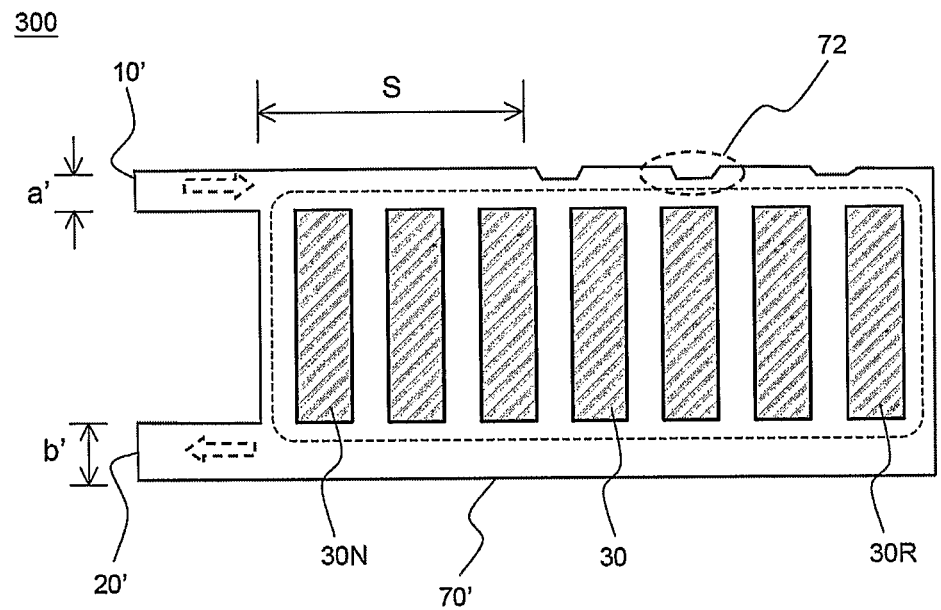
FIG. 5 is a sectional view typically illustrating a middle- or large-sized battery pack including a battery pack case according to another preferred embodiment of the present invention, the battery pack case being provided with beads.

FIG. 5 is a sectional view typically illustrating a middle- or large-sized battery pack including a battery pack case according to another preferred embodiment of the present invention, the battery pack case being provided with beads.

The battery pack case 70' according to this embodiment is different from the battery pack case 70' illustrated in FIG. 3 in that beads 72 are formed at the battery pack case 70', excluding a region S adjacent to the coolant inlet port 10', in a concavo-convex structure having a large length to width ratio, such that the beads 72 do not disturb the flow of the coolant in the advancing direction of a fluid from the coolant inlet port 10'.

Since the beads 72 are formed at the battery pack case 70' excluding the region S, it is possible to more effectively and uniformly distribute the coolant to the battery cell 30R farthest from the coolant inlet port 10', and therefore, more uniform distribution of the coolant flux is accomplished. Consequently, it is possible to further decrease the range of fluctuation between the coolant flux differences depending upon the distance difference between the coolant inlet port 10' and the battery cells 30.

Figure 6:
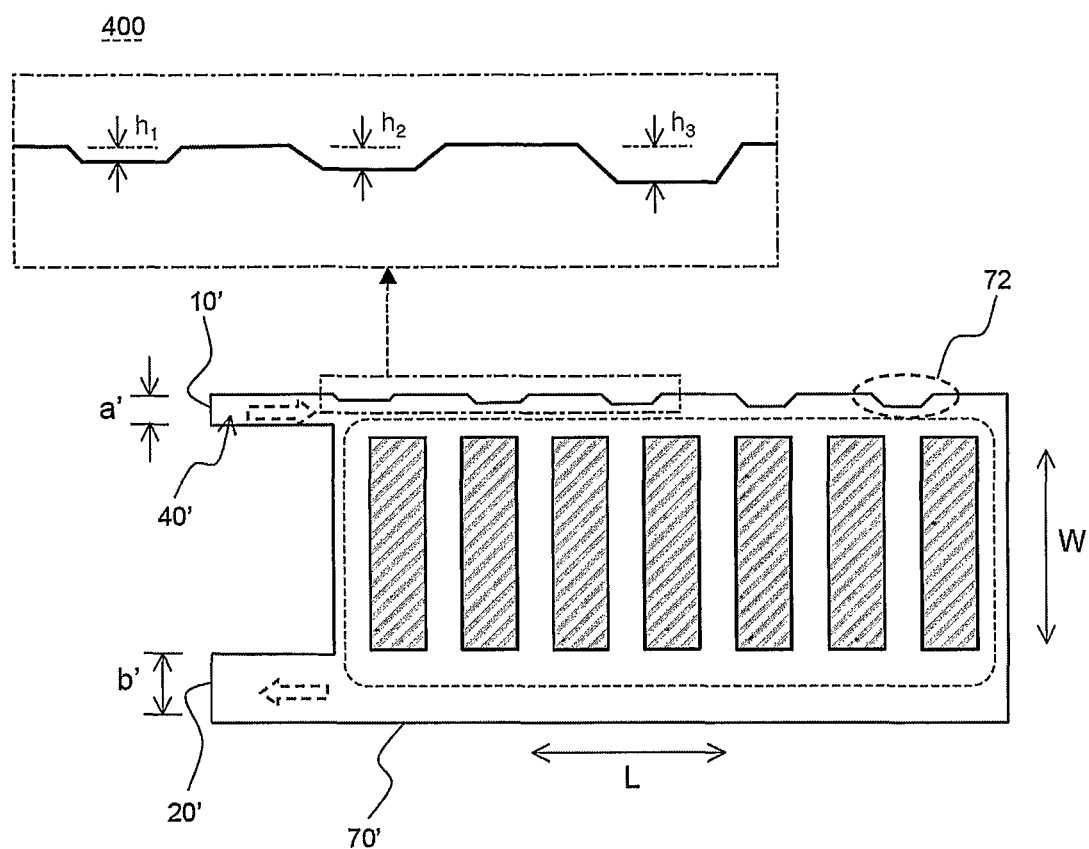
FIG. 6 is a sectional view typically illustrating a middle- or large-sized battery pack including a battery pack case according to a further preferred embodiment of the present invention, the battery pack case being provided with a plurality of beads having different heights.

FIG. 6 is a sectional view typically illustrating a middle- or large-sized battery pack including a battery pack case according to a further preferred embodiment of the present invention, the battery pack case being provided with a plurality of beads having different heights.

Referring to FIG. 6, the battery pack case 70' is constructed in a structure in which the length of the battery pack case 70' in the stacking direction L of the battery cells is greater than the length of the battery pack case 70' in the lateral direction W of the battery cells, beads 72 are formed at the battery pack case 70' such that the beads 72 are arranged parallel to the lateral direction W of the battery cells, and the inward height of the beads 72 at a predetermined region of an inlet duct 40' adjacent to a coolant inlet port 10' is gradually decreased toward the coolant inlet port 10' ($h_1 < h_2 < h_3$). This bead structure further improves the distribution uniformity of coolant flux.

INDUSTRIAL APPLICABILITY

As apparent from the above description, the middle- or large-sized battery pack case according to the present invention is constructed in a structure in which the vertical sectional area of the inlet duct is less than that of the outlet duct. Consequently, the present invention has the effect of improving the distribution uniformity of coolant flux, effectively removing heat accumulated between the battery cells, and therefore, greatly improving the performance and life span of the battery cells.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A battery pack case in which a battery module having a plurality of stacked battery cells, which can be charged and discharged, is mounted, wherein
    the battery pack case is provided with a coolant inlet port and a coolant outlet port, which are disposed such that a coolant for cooling the battery cells can flow from one side to the other side of the battery module in the direction perpendicular to the stacking direction of the battery cells,
    the battery pack case is further provided with an inlet duct extending from the coolant inlet port to the battery module and an outlet duct extending from the battery module to the coolant outlet port, the inlet duct having a vertical sectional area less than that of the outlet duct,
    the inlet duct having a constant vertical height is arranged parallel to the stacking direction of the battery cells,
    the outlet duct having a constant vertical height is arranged parallel to the stacking direction of the battery cells, and
    the inlet duct has a vertical sectional area equivalent to 50 to 90% of the vertical sectional area of the outlet duct.

2. The battery pack case according to claim 1, wherein the difference of the vertical sectional area between the ducts results from the difference of the vertical height between the ducts in a condition of the ducts having the same width.

3. The battery pack case according to claim 2, wherein the inlet duct has a vertical height equivalent to 55 to 85% of the vertical height of the outlet duct.

4. The battery pack case according to claim 1, wherein the battery pack case is constructed in a structure in which the length of the battery pack case in the stacking direction of the battery cells is greater than the length of the battery pack case in the lateral direction of the battery cells, and the ducts are arranged parallel to the stacking direction of the battery cells.

5. The battery pack case according to claim 1, wherein the battery pack case is constructed in a structure in which a suction fan is mounted in the coolant outlet port for forcibly moving the coolant, introduced through the coolant inlet port, to the coolant outlet port, after the coolant flows through the battery module.

6. The battery pack case according to claim 1, wherein the battery pack case is further provided with beads formed in a concavo-convex shape for improving the structural stability of the battery pack case against an external force, the beads being constructed in a structure in which the beads do not disturb the flow of the coolant from the coolant inlet port along the advancing direction of a fluid in the inlet duct extending from the coolant inlet port to the battery module.

7. The battery pack case according to claim 6, wherein the beads are constructed in a concavo-convex structure having a large length to width ratio, and the beads are arranged parallel to each other.

8. The battery pack case according to claim 6, wherein the battery pack case is constructed in a structure in which the length of the battery pack case in the stacking direction of the battery cells is greater than the length of the battery pack case in the lateral direction of the battery cells, the beads are formed at the battery pack case such that the beads are arranged parallel to the lateral direction of the battery cells, and the beads are not formed at a predetermined region of the inlet duct adjacent to the coolant inlet port.

9. The battery pack case according to claim 6, wherein the battery pack case is constructed in a structure in which the length of the battery pack case in the stacking direction of the battery cells is greater than the length of the battery pack case in the lateral direction of the battery cells, the beads are formed at the battery pack case such that the beads are arranged parallel to the lateral direction of the battery cells, and the inward height of the beads at a predetermined region of the inlet duct adjacent to the coolant inlet port is gradually decreased toward the coolant inlet port.

10. A battery pack constructed in a structure in which a battery module is mounted in a battery pack case according to claim 1.

11. The battery pack according to claim 10, wherein the battery module includes a plurality of plate-shaped battery cells that can be charged and discharged.

12. The battery pack according to claim 11, wherein the battery cells are lithium secondary batteries.

13. The battery pack according to claim 11, wherein the battery pack is used as a power source for electric vehicles or hybrid electric vehicles.

* * * * *